United States Patent Office 2,970,139
Patented Jan. 31, 1961

---

2,970,139

5-FLUOROURACIL NUCLEOTIDES AND PREPARATION THEREOF

Robert Duschinsky, 11 Hawthorne Road, Essex Fells, N.J.; Walter G. Farkas, 586 Highland Ave., Upper Montclair, N.J.; and Charles Heidelberger, % McArdle Memorial Laboratory, University of Wisconsin, Madison 6, Wis.

No Drawing. Filed May 20, 1958, Ser. No. 736,477

20 Claims. (Cl. 260—211.5)

This invention relates to novel products and to novel methods of making the same. More particularly, it relates to nucleotides of 5-fluorouracil and salts thereof with pharmaceutically acceptable bases; and to methods of making said nucleotides and salts.

In one of its broad aspects, the invention relates to nucleotides of 5-fluorouracil, i.e. phosphates of 5-fluorouridine and of 2′-deoxy-5-fluorouridine. (In the present specification, when the term "phosphate" is used without further qualification, it is used in a broad sense to signify an ester of phosphorus wherein the acidic portion of the ester is derived from an acid of phosphorus containing only hydrogen, oxygen and phosphorus, wherein the phosphorus present has a valence of 5, and wherein phosphorus is connected to carbon through oxygen.)

The following are illustrative of 5-fluorouracil mononucleotides included within the invention:

2′-dexoy-5-fluorouridine-5′-monophosphate;
2′-deoxy-5-fluorouridine-3′,5′-diphosphate;
5-fluorouridine-5′-monophosphate;
5-flourouridine-5′-diphosphate;
5-fluorouridine-5′-triphosphate;
5-fluorouridine-5′-diphosphate glucose; etc.

In another of its broad aspects, the invention relates to salts of 5-fluorouracil nucleotides with pharmaceutically acceptable bases, e.g. alkali metal hydroxides, alkaline earth metal hydroxides, ammonia, non-toxic organic bases (e.g. diethanolamine, morpholine), and the like.

In another of its broad aspects, the invention relates to biochemical methods of making 5-fluorouracil nucleotides, e.g. by incubating living cells in the presence of 5-fluorouracil nucleosides and nutrient material. An illustration of such biochemical methods is a process which comprises incubating Ehrlich ascites tumor cells in the presence of 2′-deoxy-5-fluorouridine and glucose.

In another of its broad aspects, the invention relates to methods of making 5-fluorouracil nucleotides by chemical synthesis. An illustration of such chemical synthetic methods is a process which comprises reacting 5-fluorouracil nucleosides (e.g. 5-fluorouridine or 2′-deoxy-5-fluorouridine) with phosphorochloridic acid, i.e. material selected from the group consisting of phosphoromonochloridic acid, phosphorodichloridic acid and mixtures thereof. A preferred procedure comprises reacting 5-fluoroouracil nucleoside in a tertiary organic base (e.g. pyridine, quinoline and the like) with phosphorochloridic acid. In general, the length of the reaction period varies with the ratio of mono- to di-component in the phosphorochloridic acid reagent; the shortest reaction time is required when using substantially pure phosphorodichloridic acid, the longest reaction time when using substantially pure phosphoromonochloridic acid, and intermediate reaction times when using mixtures of phosphoromonochloride and phosphorodichloridic acids.

The preparation of certain starting materials, used in the processes of this invention is described below in Examples A, B and C for convenience of reference, although neither these starting materials nor their preparation is claimed as part of the present invention.

(A) *Preparation of 5-fluorouridine*

To a solution of 2.3 g. (17.7 mM.) of 5-fluorouracil in 82 ml. of 0.086 N aqueous sodium hydroxide there was added a solution of 4.81 g. (17.7 mM.) of mercuric chloride in 16 ml. of ethanol. The pH of the mixture was adjusted to 5.1 by addition of 8.5 ml. of 1 N aqueous sodium hydroxide, whereupon mercury-di-5-fluorouracil precipitated. The mixture was allowed to remain overnight at 4° C., and the crystalline product was then filtered off and washed chlorine-free with water, then with ethanol and finally with diethyl ether. Yield, 3.3 g. (79.4%) of mercury-di-5-fluorouracil.

To 245 ml. of anhydrous diethyl ether, previously saturated with hydrogen chloride at 0° C., there was added 13.2 g. (26.2 mM.) of 1-O-acetyl-2,3,5-tri-O-benzoyl-β-D-ribose [Kissmann et al., J.A.C.S. 77, 21 (1955)]. The stoppered flask was allowed to remain at 4° C. for eight days. The solvent was then removed in vacuo, and thrice 40 ml. of anhydrous benzene was added to the residue and each time removed in vacuo. The residue of 2,3,5-tri-O-benzoyl-β-D-ribofuranosyl chloride was dissolved in 73 ml. of benzene.

A dry suspension of the mercury-di-5-fluorouracil was prepared by suspending 6 g. (13.1 mM.) of said mercuric salt in 130 ml. of xylene, and distilling off 40 ml. of xylene. The remaining 90 ml. of suspension was heated, and to it, while stirring, was added the 73 ml. benzene solution of tri-O-benzoyl-β-D-ribofuranosyl chloride. The mixture was refluxed for one and one-half hours, and filtered while hot. The insoluble crystalline precipitate, M.P. 236°–257° C., was identified as impure 5-fluorouracil: 2.78 g., representing a recovery of about 82%. The filtrate was cooled, whereupon 5-fluoro-2′,-3′,5′-tri-O-benzoyl-uracilribofuranoside crystallized. This crystalline precipitate was filtered off, washed with a little benzene, then with diethyl ether. Yield, 1.9 g., M.P. 185°–189° C. This material was dissolved in 22 ml. of warm ethyl acetate, then 54 ml. of petroleum ether (30°–60° C.) was added; the mixture was allowed to stand in the refrigerator, whereupon 0.85 g. of a pure product, M.P. 207°–209° C., crystallized.

The benzene-xylene filtrate, upon standing, yielded a second crop (2.07 g.) of crude product, M.P. 182°–184° C. This was recrystallized in the manner previously indicated, by dissolving it in 25 ml. of warm ethyl acetate and adding 33 ml. of petroleum ether (30°–60° C.), thereby obtaining 1.33 g. of pure 5-fluoro-2′, 3′, 5′-tri-O-benzoyl-uracilribofuranoside, M.P. 207°–209° C.

A suspension of 1 g. (1.74 mM.) of 5-fluoro-2′, 3′, 5′-tri-O-benzoyl-uracilribofuranoside, M.P. 207°–209° C., in 20 ml. of ethanolic ammonia (saturated at 0° C.) was heated in a sealed tube at 100° C. for 16 hours. The brown solution obtained was evaporated to dryness in vacuo. The residue was thrice taken up with 30 ml. of water and each time was evaporated to dryness. The brown semi-crystalline residue was taken up with 30 ml. of water and the turbid suspension obtained was extracted with five 10 ml. portions of diethyl ether, the ethereal extract being discarded. The aqueous layer was evaporated to dryness in vacuo, leaving a foamy brownish residue, which was dissolved in 2 ml. of ethanol. Addition of 8 ml. of diethyl ether precipitated 220 mg. of a tan solid.

To the mother liquor was added 30 ml. of diethyl ether, precipitating a second crop of product, M.P. 143°–144° C. (with previous softening); weight, 35 mg.

The mother liquor from this product was evaporated to dryness in vacuo, and the residue obtained was taken up with 0.5 ml. of ethanol. Addition of 10 ml. of diethyl ether precipitated a third crop of product, M.P. 136°–138° C. (with previous softening); weight, 70 mg.

For further purification of the crude N-riboside of 5-fluorouracil, the first crop of 220 mg. was dissolved in 1 ml. of 1 N aqueous sodium hydroxide solution, thereby producing a solution containing sodium salt of 5-fluorouridine. This solution was then passed through a 1.1 cm. x 23 cm. column of "Dowex 1–X4" (Dow Chemical Co., Midland, Michigan: an anion exchange resin consisting of a cross-linked copolymer of styrene with divinyl benzene [4% of the latter], containing quaternary ammonium groups as the functional groups), 100–200 mesh size, previously converted to the formate form. The resin was washed with water until the washings were neutral. Then elution was performed with 0.01 N aqueous formic acid, the eluate being collected at the rate of about 1 ml. per minute, in fractions of 25 ml. Each fraction was examined individually for ultraviolet absorption; in each of fractions 2 to 6, the ratio of absorbences 280 m$\mu$/260 m$\mu$ was 0.99 (pH 14). The total absorbence (optical density observed × dilution of sample × total vol. in ml.) was 2070, $\lambda_{max.}$ 270 m$\mu$ (pH 14).

Fractions 2 to 6 were then combined and evaporated to dryness in vacuo at 50° C. The oily residue was dissolved in 0.3 ml. of ethanol, and 4 ml. of diethyl ether was added to the solution, producing an amorphous precipitate. This was filtered off and dissolved in 3 ml. of ethanol at 60° C. Diethyl ether was added to the solution until cloudiness began to appear. The mixture was then allowed to stand overnight. The slight amount of amorphous precipitate which resulted was filtered off. The filtrate, upon evaporation in vacuo at 45° C., yielded a crystalline residue of 5-fluorouridine, weighing 48 mg. When observed on a hot stage under the microscope, the substance melted at 151°–152° C., resolidified, and then melted again at 180°–182° C., after some softening at 165° C. The ultraviolet absorption was characteristic for a riboside, and was similar to that of uridine, but with a shift of the maximum to longer wave length. As expected for a riboside, and in contrast to the free pyrimidine, there was practically no shift of the maximum in alkaline medium: at pH 7.2, $\lambda_{max.}$=269 m$\mu$, $\epsilon$=8120; at pH 14, $\lambda_{max.}$=270 m$\mu$, $\epsilon$=6500.

The second crop (35 mg., M.P. 143°–144° C.) and the third crop (70 mg., M.P. 136°–138° C.) of crude N-riboside of 5-fluorouracil, referred to above, were combined and purified by ion exchange chromatography, as described above. There was thus obtained 90 mg. of purified crystalline material; micro M.P. 147°–152° C., resolidified, then melted again at 177°–178° C., with previous softening at 172° C. At pH 7.2, $\lambda_{max.}$=270 m$\mu$, $\epsilon$=7540; at pH 14, $\lambda_{max.}$=270 m$\mu$, $\epsilon$=6330.

The total yield of 5-fluorouridine was 138 mg., i.e. 30.3% based upon tribenzoyl-5-fluorouridine, 5.5% based upon 1 - O - acetyl - 2,3,5 - tri-O-benzoyl-$\beta$-D-ribose, and 4.3% based upon 5-fluorouracial put into reaction.

(B) Preparation of 2'-deoxy-5-fluorouridine

Cells of *Streptococcus fecalis* (ATCC 8043) were grown in the AOAC folic acid assay medium [Lepper, Official and Tentative Methods of the Association of Official Agricultural Chemists, Washington, D.C., 7th edition, 784 (1950)] supplemented with 2 mg. per liter of thymine. After 20 hours of incubation at 37° C., the cells were harvested by centrifugation. The collected cells were washed three times with four volumes of potassium phosphate buffer solution $$\left(\frac{M}{15}\right)$$

aqueous $KH_2PO_4$ solution, adjusted to pH 8.0 by addition of 2 N aqueous KOH) and the wet cells were weighed. The cells were finally suspended in the above potassium phosphate buffer solution, and ground in a glass tissue homogenizer.

An amount of enzyme preparation equivalent to 4.06 g. of wet cells was made up to 105 ml. with the above identified potassium phosphate buffer solution. 200 mg. (1.54 mM.) of 5-fluorouracial and 1.50 g. (6.16 mM.) of thymidine were dissolved in 15 ml. of the potassium phosphate buffer solution referred to above. The two solutions were mixed, making a total volume of 120 ml. The mixture was incubated at 37° C. for 18 hours. After this time, enzyme action was stopped by the addition of four volumes of acetone and one volume of peroxide-free diethyl ether. The precipitated solids were removed by filtration, and the filtrate was evaporated under nitrogen at reduced pressure until substantially all volatile organic solvent had been removed. About 20 ml. of aqueous solution remained. The solution was diluted to 100 ml. with distilled water.

The solution was again evaporated in vacuo to 5 ml., and rendered alkaline by addition of 20 ml. of 1 N aqueous sodium hydroxide solution, thereby producing a mixture containing sodium salts of: N-deoxyriboside of 5-fluorouracil, thymine, thymidine and 5-fluorouracil. This mixture was purified by adsorption on an ion exchange resin and subsequent elution by means of buffer solutions of gradually increasing acidity; whereby the pyrimidine components of the mixture were eluted in the following order: thymidine, thymine, 5-fluorouracil and 2'-deoxy-5-fluorouridine. The purification was effected by passing the above mentioned alkaline mixture through a 2.2 cm. x 27 cm. column of "Dowex 1–X4" (identified in Example A above), 100–200 mesh size, previously converted to formate form and washed to neutrality as in Example A. The column was then eluted with 280 ml. aqueous ammonium formate buffer solution (pH 9.8) having a normality of 0.1 with respect to formate ion. The eluate contained no ultraviolet absorbing material. Elution was continued with aqueous ammonium formate buffer solution (pH 7.4) having a normality of 0.1 with respect to formate ion, at a flow rate of 46 ml. per hour. Then the elution was still further continued with aqueous ammonium formate buffer solution (pH 6.5) having a normality of 0.1 with respect to formate ion, at a flow rate of 60 ml. per hour. Fractions were separated at 30 minute intervals and individually examined for ultraviolet absorption at wave lengths of 260 m$\mu$ and 280 m$\mu$ (pH 14).

| Eluant | Fractions | Total Absorbence (pH 14) | | Average ratio, 280 m$\mu$/260 m$\mu$ | mM | | | |
|---|---|---|---|---|---|---|---|---|
| | | 260 m$\mu$ | 280 m$\mu$ | | A | B | C | D |
| pH 7.4 | 1–5 | 0 | 0 | [a] 1.04 | 2.33 | 2.41 | | |
| pH 7.4 | 6–17 | 23,700 | 24,500 | | | | | |
| pH 7.4 | 18–26 | 0 | 0 | | | | | |
| pH 6.5 | 27–33 | 0 | 0 | [b] 1.56 | | | 0.56 | [c] 0.44 |
| pH 6.5 | 34–48 | 3,760 | 5,870 | | | | | |
| pH 6.5 | 49–50 | 0 | 0 | | | | | |

[a] Gradually increasing from 0.75 to 1.5.
[b] Gradually decreasing from 1.97 to 0.98.
[c] 0.5 mM. of deoxyribose when assayed by method of Stumpf, J. Biol. Chem. 169, 367 (1947).
A=thymine; B=thymidine; C=5-fluorouracil; D=2'-deoxy-5-fluorouridine.

Examination of the ultraviolet absorption spectra of the individual fractions, and paper chromatography of the individual fractions, showed that fractions 6 to 17, inclusive, contained only thymine and thymidine, whereas fractions 34 to 48, inclusive, contained the fluoro compounds. Fractions 34 to 48, inclusive, were therefore combined and evaporated to dryness in vacuo. The residue obtained was dissolved in 30 ml. of the upper phase of a two-phase mixture obtained by mixing 60 volumes of ethyl acetate, 35 volumes of water, and 5 volumes of formic acid. A column 4.4 cm. x 49 cm. was then constructed by wetting 285 g. of cellulose powder (ashless, standard grade) with the upper phase of the above mentioned ethyl acetate-water-formic acid system, and tamping the wet cellulose into the absorption tube with a rod. The 30 ml. of solution were then passed through the column. Elution was performed with the upper phase of the same ethyl acetate-water-formic acid system mentioned above, at a flow rate of 40 ml. per hour, the fractions being collected at half hour intervals. The fractions were individually examined for ultraviolet absorption at wave lengths of 260 m$\mu$ and 280m$\mu$ (pH 14).

| Fractions | Total Absorbence (pH 14) | | Average ratio, 280 m$\mu$/260 m$\mu$ | mM. | |
|---|---|---|---|---|---|
| | 260 m$\mu$ | 280 m$\mu$ | | C | D |
| 1–56 | 0 | 0 | | | |
| 57–93 | 1,405 | 3,735 | 2.61 | 0.57 | 0.01 |
| 94 | 0 | 0 | | | |
| 95–96 | 118 | 124 | 1.05 | negligible | 0.02 |
| 97–104 | 1,275 | 1,905 | 0.92 | 0 | a 0.38 | a 0.39 mM. of deoxyribose, when assayed by the method of Stumpf [op. cit.].
C=5-fluorouracil; D=2'-deoxy-5-fluorouridine.

Fractions 97 to 104 were combined, and evaporated to dryness in vacuo at 45° C. The residue of 2'-deoxy-5-fluorouridine was obtained as a colorless glass. Yield 96 mg. (25.3%). The compound showed the characteristic ultraviolet absorption for a deoxyriboside, similar to that of deoxyuridine, but with a shift of the maximum to longer wave length; as expected for a deoxyriboside, and in contrast to the free pyrimidine, there was only a slight shift of the maximum in alkaline medium: at pH 7.2, $\lambda_{max.}= 268$ m$\mu$, $\epsilon=7570$; at pH 14, $\lambda_{max.}=270$ m$\mu$, $\epsilon=6480$.

(C) *Preparation of phosphorochloridic acid reagents*

(1) To 10 ml. (approximately 0.11 mol) of freshly distilled phosphorus oxychloride was added slowly, with good agitation and while cooling to 25° C., 2.0 ml. (approximately 0.11 mol) of distilled water. The mixture was then allowed to stand for about 15 hours with strict exclusion of atmospheric moisture. The product then consisted essentially of phosphorodichloridic acid, which can be represented by the Formula I*a*:

(I*a*)

(2) To 20 ml. (approximately 0.22 mol) of freshly distilled phosphorus oxychloride was added 8.0 ml. (approximately 0.44 mol) of distilled water, while stirring well and cooling to maintain a temperature of 25° C. The mixture was then allowed to stand for about 15 hours with precautions to exclude atmospheric moisture. The product then consisted essentially of phosphoromonochloridic acid, which can be represented by the formula I*b*:

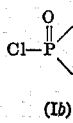

(I*b*)

(3) To 36.6 ml. (0.4 mols) of phosphorus oxychloride, technical grade, not redistilled, was added slowly, with good agitation and while cooling to about 25° C., 7.2 ml. (0.4 mol) of distilled water. The mixture was stirred until evolution of hydrogen chloride gas appeared to be mostly finished and was then allowed to stand overnight (about 15 hours). The product then consisted principally of phosphoromonochloridic acid, with a minor amount of phosphorodichloridic acid.

In each of the following examples wherein phosphorochloridic acid reagent was employed, it was used immediately after the period of standing (about 15 hours) referred to above.

The novel 5-fluorouracil nucleotides (i.e. 5-fluorouridine phosphates and 2'-deoxy-5-fluorouridine phosphates) and their salts, provided by the present invention, are useful as germicidal agents, being active, for example, against gram-positive bacterial, such as *Staphylococcus aureus*; and also as antimetabolites, being active, for example, to inhibit the growth of cells (e.g. *Lactobacillus leichmannii*) by interference with the nucleic acid metabolism.

The invention is further disclosed in the following examples, which are illustrative but not limitative thereof.

EXAMPLE 1

The following biochemical preparation was performed in duplicate: 0.25 ml. (packed volume) of Ehrlich ascites tumor cells was incubated in a total volume of 2.5 ml. of medium for 30 minutes at 37° C. The incubation medium consisted of 1 ml. of ascites serum, 1 ml. of chick embryo extract (Difco) and 0.5 ml. of isotonic saline solution containing small amounts of penicillin and streptomycin, and additionally containing glucose in such amount as to give a final concentration of 3 mg./ml. of glucose. Additionally, the incubation medium contained 123 $\mu$g. (.05 $\mu$M.) of 2'-deoxy-5-fluorouridine-2-C$^{14}$ [Duschinsky et al., J. Am. Chem. Soc. 79, 4559–60 (1957)], having a specific activity of 3,212,000 c.p.m./$\mu$M. (i.e. counts per minute per micromol). At the end of the incubation the cells were centrifuged rapidly and washed twice quickly in the cold with isotonic saline solution. The washed cells were then treated with 4% aqueous perchloric acid. The acid soluble extract so obtained was neutralized with potassium hydroxide and the potassium chlorate formed was removed by centrifugation.

The acid soluble fractions so obtained from the above duplicate preparations were pooled and subjected to chromatography as described below.

The pooled acid soluble extracts were adjusted to pH 12 by addition of potassium hydroxide solution and the liquid was then passed through a 1 cm.$^2$ x 17 cm. column of "Dowex 1–X4" anion exchange resin, 100–200 mesh size, previously converted to the formate form. After the column was loaded with the acid soluble extract, the resin was washed with water until the washings were neutral.

Elution was performed according to the following schedule, collecting 10 cc. fractions in each tube:

(1) Water wash with 100 cc. water (fractions Nos. 1 to 10)

(2) Gradient elution started with 4 N formic acid in reservoir and 500 cc. of water in the mixer (fractions Nos. 11 to 80)

(3) Gradient elution continued with 4 N formic acid, and 0.4 M ammonium formate in reservoir (fractions Nos. 81 to 150)

(4) Gradient elution finished with 4 N formic acid, and 1 M ammonium formate in reservoir (fractions Nos. 151 to 225).

The tubes were examined individually for radioactivity and it was determined that peaks appeared in the following fractions:

TABLE I

| Fraction No. | Radioactive Material [1] | Counts per minute | Calc'd. weight, µg. |
|---|---|---|---|
| 13-17 | Pyrimidine base and nucleosides | 108,000 | 8.4 |
| 56-67 | 55% FURMP, 45% FUDRMP | 27,000 | 2.7 |
| 101-110 | FURDPG | 4,500 | 0.92 |
| 131-139 | FURDP | 30,500 | 3.9 |
| 176-183 | FURTP | 52,000 | 7.8 |

[1] The abbreviations in column 2 of the above table have the following significance:
FURMP = 5-fluorouridine-5'-monophosphate, which can be represented by Formula II:

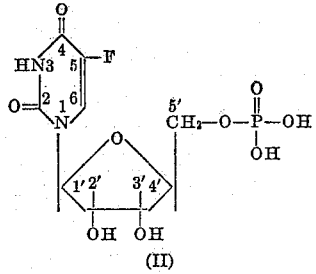

(II)

FUDRMP = 2'-deoxy-5-fluorouridine-5'-monophosphate, which can be represented by Formula III:

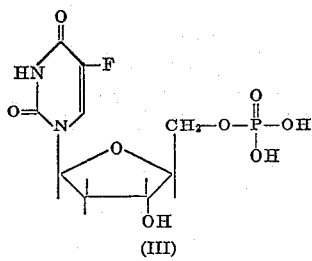

(III)

FURDPG = 5-fluorouridine-5'-diphosphate glucose, which can be represented by Formula IV:

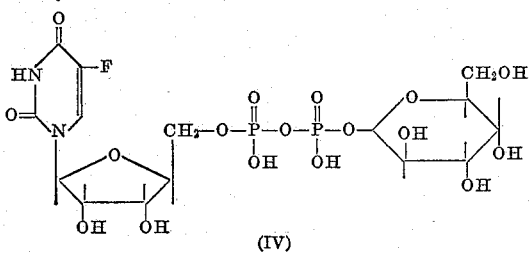

(IV)

FURDP = 5-fluorouridine-5'-diphosphate, which can be represented by Formula V:

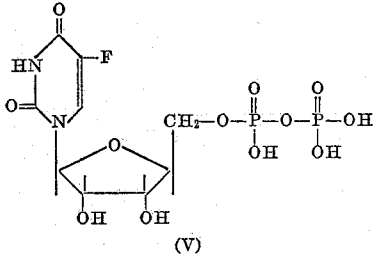

(V)

FURTP = 5-fluorouridine-5'-triphosphate, which can be represented by Formula VI:

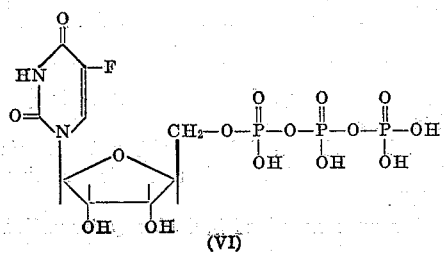

(VI)

EXAMPLE 2

50 mg. of 5-fluorouridine was dissolved in 15 ml. of dry pyridine. The clear solution was mixed with 0.3 ml. of phosphorochloridic acid reagent prepared as described in Example C(3) above. A slight rise in temperature occurred and the mixture was allowed to stand at room temperature for 18 hours. Some pyridine salts precipitated out of solution during this time as a gummy white solid. 10 ml. of water was added to the reaction mixture and the resulting solution was heated to 60° C. for 20 minutes in a warm water bath. The solution was cooled to about 25° C., the pH was brought to 7.2 by addition of dilute aqueous sodium hydroxide solution and pyridine was removed by evaporation in vacuo to a small volume. The pyridine-free residue was diluted with 100 ml. of water, the pH was adjusted to 9.0 with dilute aqueous sodium hydroxide solution and the products were adsorbed on a "Dowex 1–X4" anion exchange column, 1 cm. x 20 cm., 100–200 mesh size, previously converted to the formate form. The column was then treated as summarized in Table II below. The flow rate of eluants was 1 ml./minute and individual fractions of about 15 ml. each were collected by means of an automatic fraction collector.

TABLE II

| Function No. | Eluant | Total Absorbence (pH 1) at 270 mµ |
|---|---|---|
| 1-4 | water | 0 |
| 5-36 | 0.05 N formic acid adjusted to pH 6.5 with ammonia. | 0 |
| [column washed with water to remove ammonium ions] | | |
| 37-45 | 0.02 N formic acid | 0 |
| 46-73 | 0.5 N formic acid | 0 |
| 74-86 | 1.0 N formic acid | 0 |
| 87-104 | 2.0 N formic acid | 0 |
| 105-122 | 3.0 N formic acid | 0 |
| 123-142 | 4.0 N formic acid | 0 |
| 143-164 | 5.0 N formic acid | 0 |
| 165-184 | 7.0 N formic acid | 0 |
| 185-207 | 10.0 N formic acid | 0 |
| 203-248 | 15.0 N formic acid | 0 |
| 249-294 | column water-washed to remove excess formic acid. | 0 |
| 295 | 1.0 N formic acid adjusted to pH 6.5 with ammonia. | 2.3 |
| 296 | do | 146.0 |
| 297 | do | 81.0 |
| 298 | do | 440.0 |
| 299 | do | 104.0 |
| 300 | do | 50.3 |
| 301 | do | 46.0 |
| 302 | do | 54.5 |
| 303 | do | 52.0 |
| 304 | do | 23.4 |
| 305 | do | 19.0 |
| 306 | do | 17.7 |
| 307 | do | 17.5 |
| 308 | do | 16.5 |
| 309 | do | 14.9 |
| 310 | do | 13.7 |
| 311 | do | 13.5 |
| 312 | do | 11.2 |
| 313 | do | 10.4 |
| 314-323 | do | 70.0 |
| 324 | do | 0 |

The total absorbence of fractions 295 to 323, inclusive, amounted to 1203.9, indicating a recovery (estimated with reference to 5-fluorouridine) of 45.5 mg., i.e. 91% crude yield.

Fractions Nos. 296, 298 and 302, representing the peak fractions of three different 5-fluorouridine phosphates, were combined, diluted to a volume of 1000 ml. with water, and readsorbed on a "Dowex 1–X4" anion exchanger column, 1 cm. x 20 cm., 100–200 mesh size, previously converted to the formate form. The column was washed with 100 ml. of water after adsorption of the material, and then was treated as summarized in Table III below. Flow rate of eluants was 1 ml./minute and individual fractions of about 15 ml. each were collected by means of an automatic fraction collector.

TABLE III

| Fraction No. | Eluant | Total Absorbence (pH 1) at 270 mμ |
|---|---|---|
| 1-46 | 0.2 N formic acid adjusted to pH 6.5 with ammonia. | 0 |
| 47-69 | 0.3 N formic acid adjusted to pH 6.5 with ammonia. | 0 |
| 70-79 | 0.5 N formic acid adjusted to pH 6.5 with ammonia. | 0 |
| 80 | ---do--- | 4.05 |
| 81 | ---do--- | 14.50 |
| 82 | ---do--- | 19.50 |
| 83 | ---do--- | 22.00 |
| 84 | ---do--- | 20.50 |
| 85 | ---do--- | 11.70 |
| 86 | ---do--- | 4.20 |
| 87-117 | ---do--- | 0 |
| 118 | 0.7 N formic acid adjusted to pH 6.5 with ammonia. | 0 |
| 119 | ---do--- | 7.0 |
| 120 | ---do--- | 62.2 |
| 121 | ---do--- | 39.2 |
| 122 | ---do--- | 9.9 |
| 123-128 | ---do--- | 0 |
| 129 | ---do--- | 0.3 |
| 130 | ---do--- | 18.3 |
| 131 | ---do--- | 11.0 |
| 132 | ---do--- | 11.2 |
| 133 | ---do--- | 14.8 |
| 134 | ---do--- | 11.5 |
| 135-150 | ---do--- | 0 |

As shown by the data in Table III, the three different 5-fluorouridine phosphates were now completely separated from each other.

Fractions Nos. 80 to 86 from Table III, representing the first 5-fluorouridine phosphate, were combined and were put through a column of "Dowex 50-X8" (Dow Chemical Co., Midland, Michigan: a cation exchange resin consisting of a cross-linked copolymer of styrene with divinyl benzene [8% of the latter], containing nuclear sulfonic acid groups as the functional groups), 2.5 cm. x 35 cm., 100-200 mesh size, previously converted to the hydrogen form. The nucleotide, free of cations, was quantitatively recovered in the aqueous effluent which was collected. Formic acid was removed from the collected effluent by evaporation. The residue was diluted with water and the resulting aqueous solution was adjusted to pH 6.0 with dilute aqueous sodium hydroxide solution. The solution was then evaporated to dryness in vacuo, the residue was taken up in ethanol and the solution was again evaporated to dryness. The evaporation with ethanol was repeated several times to remove water. The residue was finally taken up in ether, the insoluble product was washed by centrifuging and decantation and was dried. In this manner there was obtained the sodium salt of a 5-fluorouridine polyphosphate having the following spectrophotometric characteristics:

pH=1: $\lambda_{max.}=270$ mμ; $E_{270}$/mg.=5.45; $\epsilon_{280}/\epsilon_{260}=0.816$
pH=4.5: $\lambda_{max.}=268$ mμ; $E_{268}$/mg.=5.87; $\epsilon_{280}/\epsilon_{260}=0.740$
pH=8.5: $\lambda_{max.}=268$ mμ; $E_{268}$/mg.=4.78; $\epsilon_{280}/\epsilon_{260}=0.829$ This material contained 1.5 μM. of organically bound phosphorus per milligram of substance.

In the same manner described above for fractions Nos. 80 to 86, fractions Nos. 119 to 122, constituting the second 5-fluorouridine phosphate, were converted to the free acid form by passage through "Dowex 50-X8" cation exchanger and were then converted to sodium salt form. This second 5-fluorouridine polyphosphate sodium salt had the following spectrophotometric characteristics:

pH=1: $\lambda_{max.}=270$ mμ; $E_{270}$/mg.=6.68; $\epsilon_{280}/\epsilon_{260}=0.834$
pH=4.5: $\lambda_{max.}=268$ mμ; $E_{268}$/mg.=6.90; $\epsilon_{280}/\epsilon_{260}=0.837$
pH=8.5: $\lambda_{max.}=268$ mμ; $E_{268}$/mg.=5.97; $\epsilon_{280}/\epsilon_{260}=0.872$ This material contained 1.7 μM. of organically bound phosphorus per milligram of substance.

In the same manner as described above for fractions Nos. 80 to 86, fractions Nos. 129 to 134, constituting the third 5-fluorouridine phosphate, were converted to the free acid form by passage through "Dowex 50-X8" cation exchanger and then were converted to the sodium salt form. This third 5-fluorouridine polyphosphate sodium salt had the following spectrophotometric characteristics:

pH=1: $\lambda_{max.}=270$ mμ; $E_{270}$/mg.=5.05; $\epsilon_{280}/\epsilon_{260}=0.813$
pH=4.5: $\lambda_{max.}=268$ mμ; $E_{268}$/mg.=5.17; $\epsilon_{280}/\epsilon_{260}=0.813$
pH=8.5: $\lambda_{max.}=268$ mμ; $E_{268}$/mg.=4.62; $\epsilon_{280}/\epsilon_{260}=0.810$ This material contained 1.7 μM. of organically bound phosphorus per milligram of substance.

Each of the three 5-fluorouridine polyphosphates characterized above, when tested for growth inhibition of *L. leichmannii*, showed high inhibitory activity.

EXAMPLE 3

1.0 g. of 2'-deoxy-5-fluorouridine was dissolved in 300 ml. of dry pyridine. To the clear solution was added, while stirring, 6.0 ml. of phosphorochloridic acid reagent prepared as described in Example C(3) above. A slight rise in temperature occurred and the mixture was stirred at 25°-30° C. for four hours. Some pyridine salts precipitated out of solution during this time as a gummy white solid. The reaction mixture was then diluted with 500 ml. of water, the pH was adjusted to 9.0 with dilute aqueous sodium hydroxide solution and the solution was passed through a column of "Dowex 1-X4" anion exchange resin, 3 cm. x 60 cm., 100-200 mesh, previously converted to the formate form. The column was washed with water until free of pyridine and then was treated as summarized in Table No. IV. Flow rate of eluants was 3 ml./minute and individual fractions of about 15 ml. were collected by means of an automatic fraction collector.

TABLE IV

| Fraction No. | Eluant | Total Absorbence (pH 1) at 270 mμ |
|---|---|---|
| 1 | 0.05 N formic acid adjusted to pH 6.5 with ammonia. | 24 |
| 2 | ---do--- | 140.0 |
| 3 | ---do--- | 240.0 |
| 4 | ---do--- | 321.0 |
| 5 | ---do--- | 536.0 |
| 6 | ---do--- | 550.0 |
| 7 | ---do--- | 693.0 |
| 8 | ---do--- | 850.0 |
| 9 | ---do--- | 1875.0 |
| 10 | ---do--- | 5950.0 |
| 11 | ---do--- | 8560.0 |
| 12 | ---do--- | 796.0 |
| 13 | ---do--- | 507.0 |
| 14 | ---do--- | 480.0 |
| 15 | ---do--- | 262.0 |
| 16 | ---do--- | 52.0 |
| 17 | ---do--- | 0 |

[column washed with water to remove excess ammonium ions, then with 500 cc. of 0.1 N formic acid to condition column for acid elution.]

| Fraction No. | Eluant | Total Absorbence (pH 1) at 270 mμ |
|---|---|---|
| 18-31 | 3.5 formic acid | 0 |
| 32 | ---do--- | 31.5 |
| 33 | ---do--- | 51.0 |
| 34 | ---do--- | 17.5 |
| 35 | ---do--- | 100.0 |
| 36 | ---do--- | 146.0 |
| 37 | ---do--- | 197.0 |
| 38 | ---do--- | 234.0 |
| 39 | ---do--- | 223.0 |
| 40 | ---do--- | 163.0 |
| 41 | ---do--- | 115.0 |
| 42 | ---do--- | 70.0 |
| 43 | ---do--- | 38.2 |
| 44 | ---do--- | 0 |

Fractions Nos. 1 to 16 contained unreacted starting material, which was recovered. Fractions Nos. 32 to 43, containing nucleotide, were combined and the formic acid was removed by evaporation to a small volume in vacuo. The residual liquid was taken to dryness by freeze drying. The solid residue was taken up in 20 ml. of water and some insoluble material was filtered off. The filtrate was adjusted to pH 6.5 with dilute aqueous sodium hydroxide solution, thereby forming a sodium salt of the nucleotide, and the solution was freeze dried. The solid residue had a weight of 84.8 mg.

A portion (73.5 mg.) of this solid was dissolved in 50 ml. of water and the material was converted to the free acid form by passage through a "Dowex 50-X8" cation exchange column, 2.5 cm. x 35 cm., in the manner indicated in the preceding example. The free nucleotide was recovered quantitatively in the aqueous effluent. The latter was freeze dried, the solid residue was dissolved in 15 ml. of methanol, a small amount of insoluble material was filtered off, and the methanolic filtrate was evaporated to dryness. The solid residue weighed 48.1 mg. It was dissolved in 5 ml. of methanol, 25 ml. of ether was added; the resulting white precipitate was washed with ether by centrifugation and decantation and then dried. There was thus obtained a white powder weighing 33.2 mg., comprising essentially 2'-deoxy-5-fluorouridine-5'-monophosphate. Spectrophotometric data for 2'-deoxy-5-fluorouridine-5'-monophosphate are:

pH=1: $\lambda_{max.}=271$ m$\mu$; $E_{271}$/mg.$=17.9$; $\epsilon_{280}/\epsilon_{260}=0.87$; absorbence/gram atom of phosphorus$=8700$ pH=13: $\lambda_{max.}=269$ m$\mu$; $E_{269}$/mg.$=14.75$; $\epsilon_{280}/\epsilon_{260}=0.84$; absorbence/gram atom of phosphorus$=7200$ This substance exhibited very high inhibitory action when assayed in a growth inhibition test on *L. leichmannii*.

EXAMPLE 4

50 mg. of 2'-deoxy-5-fluorouridine was dissolved in 15 ml. of dry pyridine. To the clear solution was added 0.3 ml. of phosphorochloridic acid reagent prepared as described in Example C(3) above. A slight rise in temperature occurred and the mixture was stirred at 25°–30° C. for 18 hours. Some pyridine salts precipitated out of solution during this time as a gummy white solid. The reaction mixture was then diluted with 10 ml. of water, heated in a water bath to 60° C. for 20 minutes, then cooled and further diluted with 50 ml. of water. The pH was adjusted to 7.2 with dilute aqueous sodium hydroxide solution and pyridine was removed by vacuum distillation. The pyridine-free solution was then brought to pH 9.0 by the addition of dilute aqueous sodium hydroxide solution and adsorbed on a "Dowex 1-X4" formate column, 1 cm. x 20 cm., 100–200 mesh size. The column was washed with 200 ml. of water and then eluted as summarized in Table V below. The flow rate of eluants was 1 ml. per minute and individual fractions of about 30 ml. each were collected by means of an automatic fraction collector.

TABLE V

| Fraction No. | Eluant | Total Absorbence (pH 1) at 270 m$\mu$ |
|---|---|---|
| 1–12 | 0.05 N formic acid adjusted to pH 6.5 with ammonia. | 0 |
| 13 | do | 9.5 |
| 14 | do | 23.2 |
| 15 | do | 41.5 |
| 16 | do | 63.5 |
| 17 | do | 111.0 |
| 18 | do | 268.0 |
| 19 | do | 720.0 |
| 20 | do | 25.0 |
| 21–33 | do | 0 |
| 34 | 0.5 N formic acid adjusted to pH 6.5 with ammonia. | 0 |
| 35 | do | 0 |
| 36 | do | 23.2 |
| 37 | do | 11.0 |
| 38 | do | 4.6 |
| 39 | do | 9.1 |
| 40 | do | 8.3 |
| 41 | do | 4.6 |
| 42 | do | 5.6 |
| 43 | do | 9.0 |
| 44 | do | 13.3 |
| 45 | do | 24.8 |
| 46 | do | 26.7 |
| 47 | do | 36.2 |
| 48 | do | 30.4 |
| 49 | do | 17.0 |
| 50 | do | 10.4 |
| 51 | do | 8.0 |
| 52 | do | 7.1 |
| 53 | do | 8.4 |
| 54 | do | 9.0 |
| 55–60 | do | 0 |

Fractions Nos. 13–20 contained unreacted starting material, which was recovered.

Fractions Nos. 36–54, containing nucleotide, were combined and diluted with 570 ml. of water and readsorbed on a "Dowex 1-X4" formate column, 1 cm. x 20 cm., 100–200 mesh, and treated as described in Table VI below. The flow rate was 1 ml. per minute and fractions of about 15 ml. each were collected by means of an automatic fraction collector.

TABLE VI (200 ml. of 0.05 N formic acid, adjusted to pH 6.5 with ammonia, was run through the column without collecting individual fractions. The effluent contained no organic product. Then elution was continued, and individual fractions were collected:)

| Fraction No. | Eluant | Total Absorbence (pH 1) at 270 m$\mu$ |
|---|---|---|
| 1 | 1.0 N formic acid adjusted to pH 6.5 with ammonia. | 0 |
| 2 | do | 0 |
| 3 | do | 5.0 |
| 4 | do | 8.3 |
| 5 | do | 23.4 |
| 6 | do | 29.4 |
| 7 | do | 19.4 |
| 8 | do | 8.3 |
| 9 | do | 7.2 |
| 10 | do | 6.0 |
| 11 | do | 4.5 |
| 12 | do | 4.5 |
| 13 | do | 4.5 |
| 14 | do | 3.6 |
| 15 | do | 3.6 |
| 16 | do | 3.3 |
| 17 | do | 3.3 |
| 18 | do | 3.4 |
| 19 | do | 3.4 |
| 20 | do | 1.8 |
| 21 | do | 1.8 |
| 22 | do | 3.1 |
| 23 | do | 3.1 |
| 24 | do | 3.0 |
| 25 | do | 3.0 |
| 26–71 | do | 0 |

Fractions Nos. 3–9, containing the major portion of the nucleotide, were combined and the product was converted to the free acid form by passage through a "Dowex 50-X8" cation exchange column, 1.0 cm. x 20 cm., in the manner indicated in the preceding example. The free nucleotide was quantitatively recovered in the effluent.

The effluent was evaporated to about 10 ml. in vacuo to remove most of the formic acid, 25 ml. of ethanol was added and the solution was evaporated in vacuo to dryness. The residue was taken up in 25 ml. of ethanol and again evaporated to dryness. The solid residue was then dissolved in 40 ml. of water and the pH was brought to 6.5 by the addition of dilute aqueous sodium hydroxide solution, thereby forming the sodium salt of the nucleotide. The solution was again evaporated to dryness in vacuo. The solid residue weighed 16.0 mg. 8 mg. of the substance was again dissolved in 4.5 ml. of water and freeze dried to obtain a uniform product. The weight of sodium salt of 2'-deoxy-5-fluorouridine-3',5'-diphosphate, thus obtained, was 7.2 mg. It had the following spectrophotometric characteristics:

pH=1.0: $\lambda_{max.}=268$ m$\mu$; $E_{268}$/mg.$=10.0$; $\epsilon_{280}/\epsilon_{260}=0.88$ It contained 2.22 $\mu$M. of organically bound phosphorus per milligram. This nucleotide was also very highly active in a growth inhibition test on *L. leichmannii*.

EXAMPLE 5

To 0.5 ml. of dry pyridine was added 10 mg. of 2'-deoxy-5-fluorouridine with strict exclusion of atmospheric moisture. To the clear solution was added, while agitating, 0.03 ml. of phosphorochloridic acid reagent prepared as described in Example C(1) above. There was a slight rise in temperature and the reaction mixture was kept at a temperature of 25° C. by cooling. The reaction was allowed to proceed for 10 minutes with continuing precautions to exclude atmospheric moisture. A small amount of pyridine salts precipitated as a white gummy solid during this time. 0.5 ml. of water was then added to the reaction mixture while cooling. A clear, water-white solution resulted. 0.01 ml. of this reaction solution, corresponding to 0.1 mg. of 2'-deoxy-5-fluorouridine, was analyzed by paper chromatography (Whatman No. 1 paper, system n-butanol-acetic acid-water, ratio 5:2:3). About 40% of the total product was found to be 2'-deoxy-5-fluorouridine-5'-monophosphate, by comparison with an authentic sample in the same chromatographic system. There was formed also some 2'-deoxy-5-fluorouridine-3',5'-diphosphate.

We claim:

1. A compound selected from the group consisting of 5-fluorouracil nucleotides and salts thereof with pharmaceutically acceptable bases.
2. A process of making 5-fluorouracil nucleotides which comprises reacting 5-fluorouracil nucleoside with phosphorochloridic acid.
3. 5-fluorouracil mononucleotide.
4. 5-fluorouracil N-ribotide.
5. A process of making 5-fluorouracil N-ribotide which comprises reacting 5-fluorouracil N-riboside with phosphorochloridic acid.
6. 5-fluorouracil N-deoxyribotide.
7. A process of making 5-fluorouracil N-deoxyribotide which comprises reacting 5-fluorouracil N-deoxyriboside with phosphorochloridic acid.
8. 5-fluorouridine phosphate.
9. A process of making 5-fluorouridine phosphate which comprises reacting 5-fluorouridine with phosphorochloridic acid.
10. 2'-deoxy-5-fluorouridine phosphate.
11. 5-fluorouridine-5'-monophosphate.
12. 2'-deoxy-5-fluorouridine-5'-monophosphate.
13. A process of making 2'-deoxy-5-fluorouridine-5'-monophosphate which comprises reacting 2'-deoxy-5-fluorouridine with phosphorochloridic acid.
14. 5-fluorouridine polyphosphate.
15. 5-fluorouridine-5'-diphosphate.
16. 5-fluorouridine-5'-triphosphate.
17. 5-fluorouridine-5'-diphosphate glucose.
18. 2'-deoxy-5-fluorouridine-3',5'-diphosphate.
19. A phosphate of N-glycoside of 5-fluorouracil.
20. A salt of a compound according to claim 19 with a pharmaceutically acceptable base.

References Cited in the file of this patent

UNITED STATES PATENTS 2,174,475     Ostern                Sept. 26, 1939
2,815,342     Khorana              Dec. 3, 1957

OTHER REFERENCES

Bredereck et al.: "Berichte" 73, 269–273 (1940).
Fukuhara et al.: "Journal of Biological Chemistry," 190, 95–100 (1950).
Anand et al.: "Chemical Society Journal," Pt. 3, 1952, pp. 3665–3669.